2,739,066
STABILIZATION OF FATS AND OILS WITH 2,4,5-TRIHYDROXYBENZOIC ACID

Alan Bell, M B Knowles, and Clarence E. Tholstrup, Kingsport, Tenn., assignors to Eastman Kodak Company, Rochester, N. Y., a corporation of New Jersey
No Drawing. Application August 2, 1952,
Serial No. 302,413
7 Claims. (Cl. 99—163)

This invention relates to the stabilization of fats, oils and other organic materials subject to deterioration employing 2,4,5-trihydroxybenzoic acid as an antioxidant.

It is an object of our invention to provide a compound which possesses improved antioxidant properties which are particularly useful in the stabilization of fats and oils. Another object is to provide antioxidant compositions containing the 2,4,5-trihydroxybenzoic acid admixed with a synergist. A further object of our invention is to provide antioxidant compositions of this nature dissolved in an inert organic solvent. An additional object is to provide stabilized fats and oils containing such antioxidant compositions. A still further object of our invention is to provide processes for preparing such stabilized fats and oils. Other objects will become apparent hereinafter.

In accordance with our invention, stabilized fats and oils can be prepared which contain from about 0.001 percent to about 1.0 percent by weight of 2,4,5-trihydroxybenzoic acid.

It is known that 1,2,4-trihydroxybenzene can be employed for the stabilization of fats and vegetable oils. There is no suggestion, however, in the prior art that derivatives of this compound would also be useful as antioxidants for fats, vegetable oils and other organic materials subject to deterioration. The introduction of the group —CO—R wherein R is an H atom or an alkyl, alkenyl, aryl or furyl radical on the benzene ring of 1,2,4-trihydroxybenzene has been found to result in the formation of compounds which have excellent antioxidant properties as disclosed in our copending application, Serial No. 302,412, filed on even date herewith. The same is true when R is an OH group as in the instant invention. This was wholly unexpected and unpredictable especially since the introduction of —CO—R substituents on the nucleus of hydroquinone gives compounds with very little antioxidant value. The following table presents data relating to the effect of the introduction on the nucleus of hydroquinone of a —CO—R radical wherein the radical substituted is —COOH, —COCH$_3$, —CO(CH$_2$)$_2$CH$_3$, and —COC$_6$H$_5$. This data is based on tests conducted under the Active Oxygen Method (AOM) which is described hereinbelow. These tests were conducted employing lard as the substrate which had an AOM value of 4 hours for lard A, 10 hours for lard B and 12.5 hours for lard C when the lard contained no antioxidant. The concentration in each instance was 0.02 percent by weight of the antioxidant in the lard.

| Antioxidant | AOM Value in Hours | | |
|---|---|---|---|
| | Lard A | Lard B | Lard C |
| Control (No Antioxidant) | 4.0 | 10 | 12.5 |
| Gallic Acid | | 88 | 90 |
| Hydroquinone | 118 | 125 | |
| 1,2,4-Trihydroxybenzene | | 101 | 135 |
| 2,5-Dihydroxyacetophenone | 10 | | |
| 2,4,5-Trihydroxyacetophenone | | | 183 |
| 2,5-Dihydroxybutyrophenone | 11 | | |
| 2,4,5-Trihydroxybutyrophenone | | | 160 |
| 2,5-Dihydroxybenzophenone | 7.0 | | |
| 2,4,5-Trihydroxybenzophenone | | | 173 |
| 2,4,5-Trihydroxybenzoic acid | | 250 | |

The difference between the dihydroxy and the trihydroxy derivatives is indeed remarkable, as indicated by the above table. Moreover, 2,4,5-trihydroxybenzoic acid is unexpectedly tremendously superior to gallic acid which is an isomer thereof.

The introduction of the —COOH substituent on to the nucleus of 1,2,4-trihydroxybenzene gives products which have many advantages as antioxidants over 1,2,4-trihydroxybenzene itself. Thus 2,4,5-trihydroxybenzoic acid is stable to air, is less water-soluble and more fat-soluble and is a more potent antioxidant than 1,2,4-trihydroxybenzene. All of these properties make this compound more useful as an antioxidant for fats and oils. The compound 2,4,5-trihydroxybenzoic acid can be employed for the stabilization of other organic compounds subject to deterioration in addition to fats and oils, e. g. carotene, plastic compositions, etc. The oils which can be stabilized include mineral oils as well as vegetable oils and can be extended to include paraffin and other organic compounds of similar characteristics.

When employed as an antioxidant for fats, oils and the like, fractions of a percent of 2,4,5-trihydroxybenzoic acid can be incorporated into such materials as lard, cottonseed oil, peanut oil, paraffin, etc., by admixing the antioxidant with the fat or oil whereby a solution of the antioxidant in the substrate is obtained. Alternatively, the antioxidant can be blended with suitable solvents to form an antioxidant solution. Examples of such solvents include glycerin, propylene glycol, hexane, etc., or other similar solvents which are inert insofar as concerns both the antioxidant and the other components of the ultimately prepared stabilized fat or oil. Such antioxidant solutions can be more readily dissolved in the fat or oil to be stabilized with less necessity for prolonged mixing of the fat or oil with the undissolved antioxidant. Similarly, synergists can be admixed with the fats or oils along with the dry 2,4,5-trihydroxybenzoic acid or, in order to facilitate the incorporation of the antioxidant and the synergist into the fat or oil, they can both be dissolved in such solvents as described above. Examples of synergists which can be employed include citric acid, tartaric acid, phosphoric acid, ascorbic acid, propyl gallate, etc. In addition to the employment of 2,4,5-trihydroxybenzoic acid alone, as described hereinbefore, admixtures with other antioxidants together with one or more synergists can be employed.

In addition to the fats and oils mentioned above which can be stabilized by the antioxidants of this invention, other representative fats and oils include linseed oil, menhaden oil, cod liver oil, castor oil, olive oil, rape seed oil, coconut oil, palm oil, corn oil, sesame oil, peanut oil, babassu oil, butter fat, lard, beef tallow, etc., as well as hydrogenated oils and fats prepared from any of the foregoing. Furthermore, various other oils and fats may be similarly treated within the scope of this invention. In addition, the antioxidants of this invention can be employed in certain instances to stabilize fuels, plastic compositions, the carotene content of foods, mineral oils, paraffin, etc., as mentioned above.

A preferred procedure for preparing —CO—R derivatives of 1,2,4-trihydroxybenzene (R is defined above) is set forth in the copending application by us which has been referred to above. Thiele and Jaeger, Ber. 34, 2840 (1901) describe a method for the preparation of 2,4,5-trihydroxybenzoic acid.

Inasmuch as it is well known in the art to employ antioxidants in the stabilization of fats and oils, it is not believed necessary to give numerous specific examples of how the 2,4,5-trihydroxybenzoic acid can be blended with fats or oils nor the specific proportions which can be employed in the many possible examples which would come within the scope of the description hereinabove.

The following tabulation and data are presented in order to show the properties of some of the antioxidants of this invention and how their properties compare with other antioxidants known in the prior art. This data is based on tests conducted under the AOM method employing lard as the substrate.

| Antioxidant | Percent Added | Lard B | Lard D |
|---|---|---|---|
| Control | 0.00 | 10.0 | 3.5 |
| Gallic Acid | 0.02 | 88.0 | |
| Hydroquinone | 0.02 | 125.0 | |
| BHA (viz. tert. butyl-p-hydroxyanisole) | 0.01 | 28.0 | 17.0 |
|  | 0.02 | 31.0 | 23.0 |
|  | 0.01 |  | 45.0 |
| Propyl Gallate | 0.02 | 66.0 | 60.0 |
|  | 0.01 | 121.0 | 132.0 |
| 2,4,5-Trihydroxybenzoic acid | 0.02 | 250.0 | 255.0 |

The data presented above is based on tests conducted under equivalent conditions employing similar samples in each instance. The AOM figures are in hours. The procedure employed under the AOM (Active Oxygen Method) is well known in the antioxidant art and can be explained in this specification briefly as follows:

A weighed quantity (0.01–0.02 percent by weight) of the compound to be tested was dissolved in the lard or oil. The resulting solution was placed in a bath at 99° C. and air was then bubbled through at a rate of approximately 2.3 ml. per second. Periodically, a portion of the test solution was removed and the peroxide content quantitatively determined by iodometric titration, expressing the results as milliequivalents per kilogram of fat or oil. Experience has shown that initial rancidity in lard corresponds closely to a peroxide value of 20 and to 70 in oil such as cottonseed oil and peanut oil. The latter value has not been firmly established but is useful for comparative purposes. A control containing no additives was run simultaneously with the test compound to determine the induction period of the unstabilized materials. The final results are expressed in the number of hours required for rancidity to develop; i. e., an AOM value of 40 for a sample of lard means that 40 hours was required to form 20 milliequivalents of peroxide per kilogram of the lard.

A perusal of the data contained in the last table indicates that 2,4,5-trihydroxybenzoic acid is, insofar as its stabilization characteristics are concerned, clearly superior to antioxidants which are commercially available such as tertiary butyl-p-hydroxy anisole and propyl gallate as well as other antioxidants known in the prior art such as gallic acid.

In addition to its employment in stabilizing lard, 2,4,5-trihydroxybenzoic acid can also be employed in the stabilization of other fats and oils as described hereinabove.

As a more specific description based on the above disclosure, the stabilized fats and oils provided by this invention contain from about 0.001 to about 1.0% by weight of an antioxidant comprising 2,4,5-trihydroxybenzoic acid. This invention clearly covers combinations of this antioxidant with other antioxidants as referred to above, e.g., isomers of tert. butyl-p-hydroxyanisole, propyl gallate, etc., some of which combinations of antioxidants may be synergistic in nature. Accordingly, the invention covers fats and oils stabilized with from about 0.001% to about 1.0% by weight of 2,4,5-trihydroxybenzoic acid admixed with from about 0.005% to about 0.1% by weight of the fat or oil of a synergist, e. g. citric acid, tartaric acid, phosphoric acid, propyl gallate, etc. This invention also covers the processes involved in preparing such stabilized fats and oils.

What we claim as our invention and desire to secure by Letters Patent of the United States is:

1. Stabilized fats and oils containing from about 0.001% to about 1.0% by weight of 2,4,5-trihydroxybenzoic acid.

2. Stabilized fats and oils containing from about 0.001% to about 0.1% by weight of 2,4,5-trihydroxybenzoic acid.

3. Lard stabilized with from about 0.001% to about 0.1% by weight of 2,4,5-trihydroxybenzoic acid.

4. A process for stabilizing fats and oils which comprises admixing therewith from about 0.001% to about 0.1% by weight of 2,4,5-trihydroxybenzoic acid.

5. A process for stabilizing lard which comprises admixing therewith from about 0.001% to about 0.1% by weight of 2,4,5-trihydroxybenzoic acid.

6. Stabilized fats and oils containing from about 0.0005% to about 0.1% by weight of a synergist selected from the group consisting of citric acid, tartaric acid, phosphoric acid, ascorbic acid and propyl gallate and from about 0.001% to about 1.0% by weight of 2,4,5-trihydroxybenzoic acid.

7. Lard containing from about 0.0005% to about 0.1% by weight of a synergist selected from the group consisting of citric acid, tartaric acid, phosphoric acid, ascorbic acid and propyl gallate and from about 0.001% to about 1.0% by weight of 2,4,5-trihydroxybenzoic acid.

References Cited in the file of this patent

Bergl: Chem. and Ind., April 1944, pages 127–128.
Riemenschneider: Trans. Am. Assoc. Cereal Chem. 5(1).